(12) United States Patent
Engle et al.

(10) Patent No.: US 6,513,048 B1
(45) Date of Patent: Jan. 28, 2003

(54) METHOD AND APPARATUS FOR ACCESS TO FILES STORED ON A MAINFRAME USING A PERSONAL COMPUTER USER INTERFACE

(75) Inventors: Bruce Engle, San Francisco, CA (US); Kevin Parker, Danville, CA (US)

(73) Assignee: Serena Software, Inc., San Mateo, CA (US)

( * ) Notice: Subject to any disclaimer, the term of this patent is extended or adjusted under 35 U.S.C. 154(b) by 0 days.

(21) Appl. No.: 09/441,795

(22) Filed: Nov. 17, 1999

(51) Int. Cl.[7] .......................... G06F 12/00; G06F 17/30
(52) U.S. Cl. ........................................ 707/200
(58) Field of Search .................. 707/10, 7, 201, 707/200, 205; 709/219, 217, 203, 117, 119; 711/136

(56) References Cited

U.S. PATENT DOCUMENTS

| | | | | |
|---|---|---|---|---|
| 5,146,561 A | * | 9/1992 | Carey et al. ................. | 707/10 |
| 5,390,318 A | * | 2/1995 | Ramakrishnan et al. .... | 711/136 |
| 5,815,703 A | * | 9/1998 | Copeland et al. ........... | 345/759 |
| 5,857,203 A | * | 1/1999 | Kauffman et al. ........... | 707/10 |
| 5,878,228 A | * | 3/1999 | Miller et al. ................. | 370/458 |
| 5,890,147 A | * | 3/1999 | Peltonen et al. .............. | 707/1 |
| 5,893,116 A | * | 4/1999 | Simmonds et al. ......... | 707/201 |
| 5,944,789 A | * | 8/1999 | Tzelnic et al. ................. | 707/7 |
| 5,948,062 A | * | 9/1999 | Tzelnic et al. ............... | 707/10 |
| 5,956,712 A | * | 9/1999 | Bennett et al. .............. | 707/10 |
| 5,987,471 A | * | 11/1999 | Bodine et al. ............. | 345/764 |
| 6,061,714 A | * | 5/2000 | Housel et al. .............. | 709/203 |
| 6,192,408 B1 | * | 2/2001 | Vahalia et al. ............. | 709/217 |
| 6,199,107 B1 | * | 3/2001 | Dujari ........................ | 709/219 |
| 6,253,208 B1 | * | 6/2001 | Wittgreffe et al. ........... | 705/14 |

* cited by examiner

*Primary Examiner*—John Breene
*Assistant Examiner*—Susan Rayyan
(74) *Attorney, Agent, or Firm*—Innovation Partners; Charles E. Gotlieb (57) ABSTRACT

A method and apparatus allows files stored on a mainframe computer system to be manipulated from a client computer system such as a personal computer. The mainframe may be represented by a UNC identifier or drive letter and a hierarchical folder structure may be arranged for the UNC identifier or drive letter in a manner consistent with the manner for arranging folders for locally stored files. Filenames or templates capable of describing multiple filenames may be associated with each folder to allow files on the mainframe to be manipulated using the hierarchical folder structure in a manner similar to that of locally stored files.

24 Claims, 3 Drawing Sheets

METHOD AND APPARATUS FOR ACCESS TO FILES STORED ON A MAINFRAME USING A PERSONAL COMPUTER USER INTERFACE

RELATED APPLICATION

The subject matter of this application is related to the subject matter of application Ser. No. 09/442,018, entitled, "METHOD AND APPARATUS FOR CONVERTING FILES STORED ON A MAINFRAME COMPUTER FOR USE BY A CLIENT COMPUTER", filed by Bruce Engle and Kevin Parker on Nov. 17, 1999; application Ser. No. 09/441,764, entitled, "METHOD AND APPARATUS FOR SERVING FILES FROM A MAINFRAME TO ONE OR MORE CLIENTS", filed by Bruce Engle and Kevin Parker on Nov. 17, 1999; and application Ser. No. 09/441,765, entitled, "SYSTEM AND METHOD FOR LOGGING INTO A MAINFRAME COMPUTER SYSTEM" filed on Nov. 17, 1999 by Bruce Engle and Kevin Parker each having the same assignee as this application and each is incorporated herein by reference in its entirety.

FIELD OF THE INVENTION

The present invention is related to computer software and more specifically to computer software for organizing remote files.

BACKGROUND OF THE INVENTION

Information on a computer system can be arranged in many different files. Different computer systems use different arrangements for storing files. Files on a conventional IBM-compatible computer systems such as are available from DELL computer corporation of Round Rock, Tex. running operating systems with graphical user interfaces such as the Windows 95 or Windows 98 operating system commercially available from Microsoft Corporation of Redmond, Wash. may be organized into hierarchical folders. MACINTOSH personal computer systems commercially available from APPLE COMPUTER CORPORATION of Cupertino, Calif. also use a hierarchical arrangement of folders to organize files. Because the files of a personal computer system may be managed by the users of that system, the hierarchical arrangement of files in a personal computer system allows users to keep track of small groups of files in folders that are hierarchically arranged. A hierarchical arrangement of folders allows folders to contain files or folders.

In contrast to the hierarchical arrangement employed by personal computer system software, conventional mainframe computer systems such as the S/390 computer system running the MVS operating system, both commercially available from IBM Corporation of White Plains, N.Y. do not use a hierarchically-arranged file system. Every mainframe file, known as a file, is on the same, single level. Thus, the arrangement of mainframe files can be referred to as a "flat file system." Because the files in a mainframe computer system are not typically manipulated by the user to the extent of the files in a personal computer system, the flat file arrangement is an acceptable arrangement from the user interface perspective. In, addition, the use of a flat file arrangement allows a file used by one application to be available to another application, without having to keep track of the particular folder used for referencing the file.

The users of a particular type of computer system have come to expect the file arrangement provided by that type of computer system. Additionally, the software of each type of computer system expects the file arrangement provided by that type of computer system. Problems arise, however, when both types of computer systems are used together in a network with the personal computer acting as the client and the mainframe acting as the server and files are shared between the two systems.

It is possible to access files on a mainframe computer system from a personal computer system. One example of such access is to generate a list of files. However, such access is not convenient for the user of the personal computer system because, without the use of a folder system to group files, the mainframe files are all listed together. The benefits of the hierarchical file arrangement are not made available to the user of the personal computer when accessing files on the mainframe computer system. Even if a user were allowed to assign the files of the mainframe to folders on the mainframe, additional problems would result because files on a mainframe computer system are sometimes shared by many users. Because some users would want to organize mainframe files in one manner and other users might want to organize the very same files in a different manner, mainframe computers avoid the folder model. In addition, because the scope of information. contained in some mainframe files can be wider than the scope of information contained in conventional personal computer files, assigning a mainframe file to a single folder may not be convenient. Because a mainframe file may be wider in scope than the folder in which it is arranged, users may desire the file be assigned to multiple folders.

What is needed is a method and apparatus that can allow mainframe files to be organized on a personal computer in a hierarchical arrangement that allows different personal computer users or applications to arrange the mainframe files in a manner that best suits each user's or application's needs.

SUMMARY OF INVENTION

A method and apparatus registers as a network drive or UNC provider to the operating system on the client computer system, and represents the mainframe computer system to the user and any applications of the personal computer system. The method and apparatus allows a hierarchical folder structure to be assigned to the representation of the mainframe. One or more mainframe files can be assigned to each folder in the hierarchical file system. The files can be assigned to each folder by designating for each folder, one or more individual filenames or templates that can encompass multiple filenames. The folder structure and files assigned to each folder are stored in a registry that can be associated with one client computer system or multiple client computer systems or both, allowing each client computer system or group of client computer systems to have files arranged in a manner most suitable to that client computer system or group of client computer systems. The user or application can request the contents of a selected folder, and the method and apparatus retrieves from the registry the filenames and templates associated with the selected folder and uses the filenames and templates to identify the names of matching files on the mainframe. The list of matching files and any subfolders of the folder can be provided to the requester using an interface similar to that used for files stored locally on the client computer system. When a mainframe file is requested on the client computer system, the file may be retrieved from the mainframe to the client computer system in whole or in part.

DETAILED DESCRIPTION OF A PREFERRED EMBODIMENT

Figure 1:
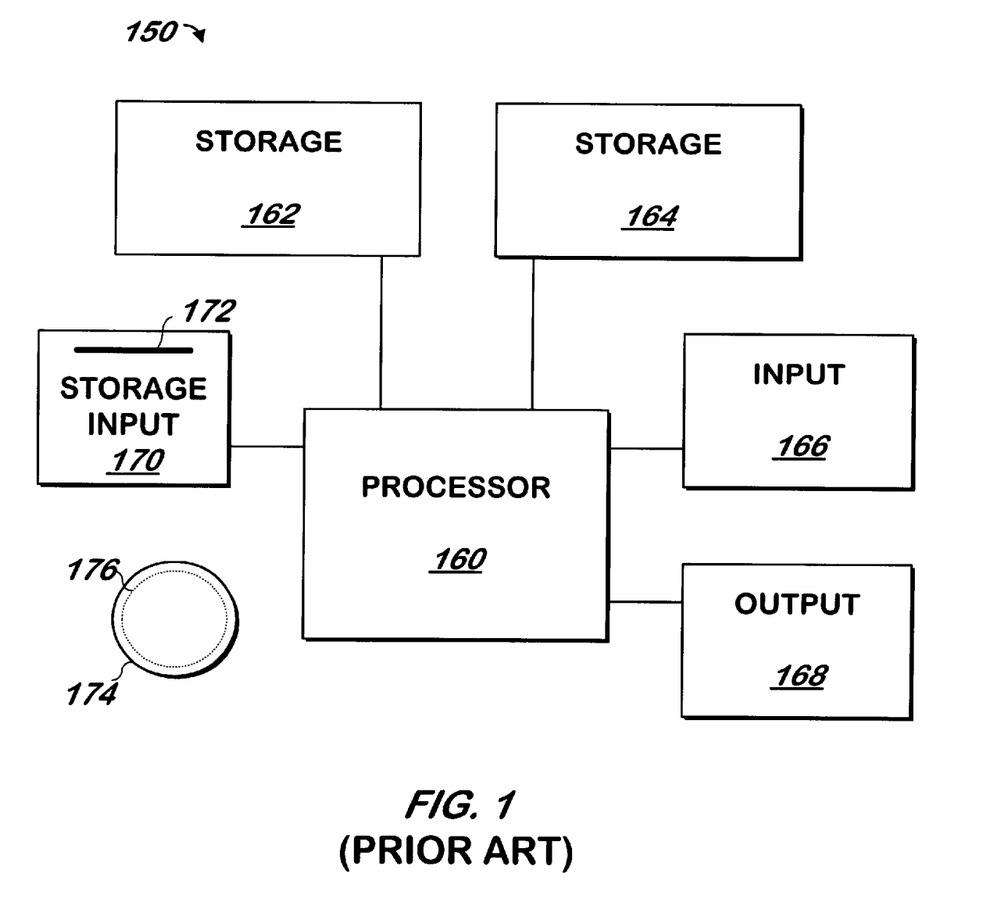
FIG. 1 is a block schematic diagram of a conventional computer system.

The present invention may be implemented as computer 7 software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional PENTIUM III-compatable computer system commercially available from DELL COMPUTER CORPORATION of Round Rock, Tex. running the conventional WINDOWS 95/98/NT operating system commercially available from MICROSOFT CORPORATION of Redmond, Wash., or a S/390 mainframe computer system running the conventional MVS operating system each commercially available from IBM CORPORATION of White Plains, N.Y., although other systems may be used.

Figure 2:
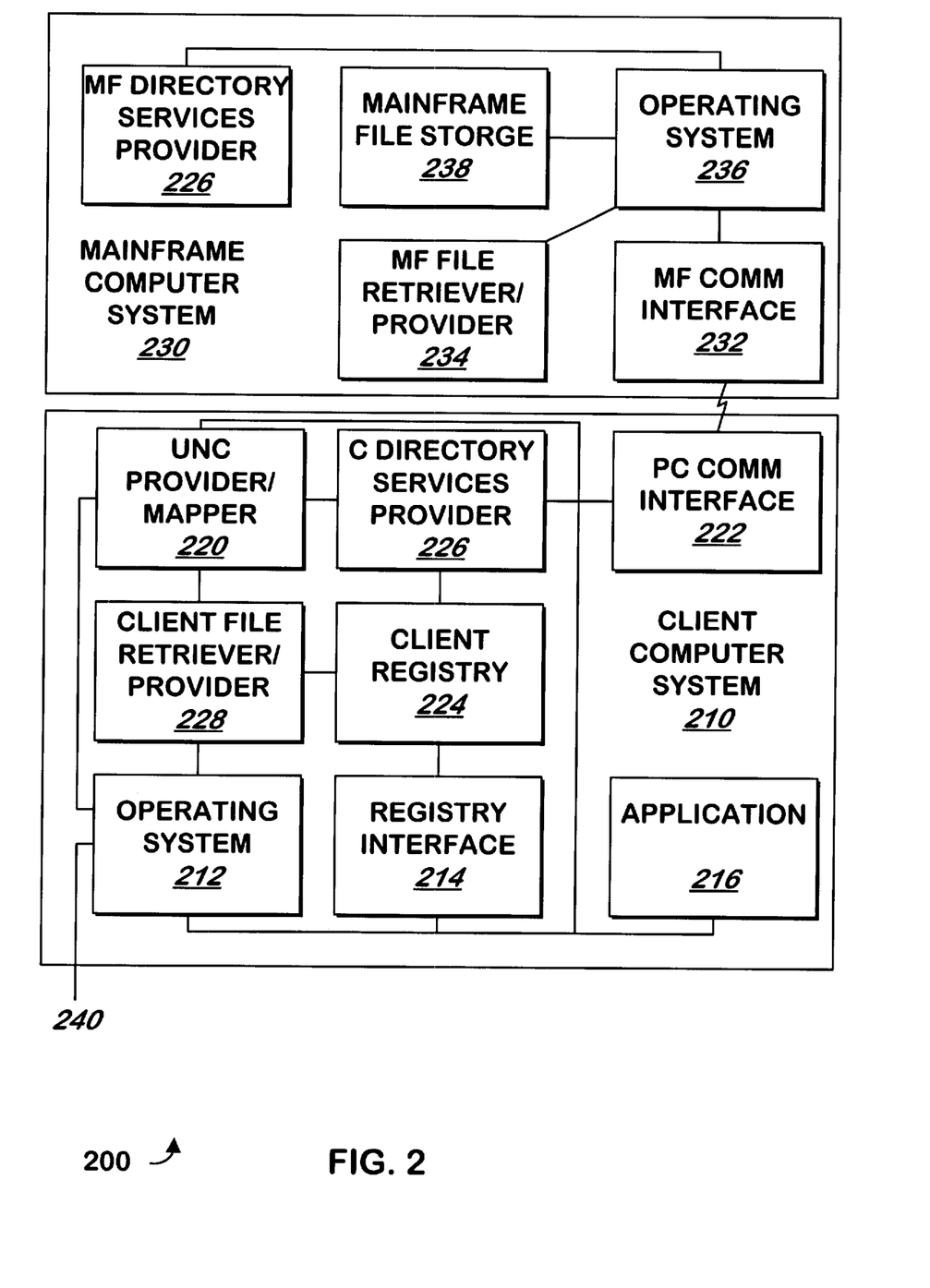
FIG. 2 is a block schematic diagram of an apparatus for accessing and manipulating mainframe computer files from a client computer system according to one embodiment of the present invention.

Referring now to FIG. 2, an apparatus for accessing and manipulating mainframe computer files from a client computer system is shown according to one embodiment of the present invention. Each mainframe computer file may be any collection of data, such as a partitioned data set. The apparatus includes client computer system 210 and mainframe computer system 230. The client computer system 210 which may be any conventional Pentium-compatible computer system, will now be described.

Operating system 212 is the conventional WINDOWS 95/98/NT operating system described above. Users interact with operating system 212 via input/output 240, which may be coupled to a conventional keyboard/mouse/monitor combination of devices.

UNC provider/mapper 220 registers itself to operating system 212 as a UNC provider, network provider or both. The registration may be performed at startup, by having UNC provider get called from the WINDOWS startup folder, or at any other time. To register as a UNC provider with the Windows NT operating system, UNC provider/mapper 220 uses the conventional WINDOWS NT FsRtl-RegisterUncProvider application programming interface. To register as a network provider, UNC provider/mapper 220 makes the appropriate entries into the Windows Registry to register a portion of UNC provider/mapper 220 that is a DLL for an available drive letter as set forth in Rajeev Nagar, "Windows NT File System Internals"(1997 O'Reilly & Associates, ISBN 1-56592-249-2). A network provider is assigned a drive letter such as "H." while a UNC provider may use names containing multiple letters. Operating system 212 provides requests it receives to UNC provider/mapper 220 based on either registration. For example, if operating system 212 receives a request to open a directory and list the contents of the directory, if the request contains a drive letter that matches the drive letter registered by UNC provider/mapper 220, operating system 212 routes the request to UNC provider/mapper 220. If necessary, operating system 212 will also load the DLL portion of UNC provider/mapper 220 that was registered as described above. Registering to WINDOWS NT is described in Rajeev Nagar. Windows NT File System Internals (O'Reilly and Associates, 1997, ISBN 1-56592-249-2) and in the Installable File System Kit commercially available from MICROSOFT CORPORATION of Redmond, Wash.

There may be other UNC providers (not shown) that provide other services. When operating system 212 receives a request for services requiring the use of a UNC-identified device, operating system 212 broadcasts the request to all registered UNC providers and the UNC providers must signal operating system if they recognize the UNC device identifier contained in the request. UNC provider/mapper 220 watches for the UNC it stores internally as described above, and signals operating system 212 when it receives the identifier stored internally as described above. In addition, UNC provider/mapper 220 signals client directory services provider 226, client file retriever/provider 228 or registry interface 214 according to the request it receives.

Registry interface 214 is an application that maintains in client registry 224, which may be an area of conventional storage such as a file on a disk or an area in memory, a description of a hierarchy of folders as well as properties of each folder. A "files" property of a folder is one of these properties, and contains a description of any number of files that may be associated with each folder. A user can use input/output 212 to instruct operating system 212 to add a folder to the hierarchy of folders, and operating 212 displays the new folder with the name, "new folder". Operating system then provides the name of the folder and a request to create and open the new folder to registry interface 214. Registry interface 214 adds to client registry 224 a folder object having a name property equal to the name of the folder to a tree structure of folder objects. The tree structure represents the folder hierarchy, so registry interface 214 adds the object at the position in the tree corresponding to the position indicated by the request it receives. The user can then rename the folder, move the folder or delete the folder using registry interface 214. An application such as application 216 may perform any of these functions (as well as any function described below) directly by signaling operating system 212 using conventional commands that would perform these functions for files stored locally on client computer system 210.

The user (or application 216) can then assign one or more mainframe files to the folder using names of files stored on the mainframe computer system 230 or using templates of filenames containing wildcard symbols that can correspond to one or more filenames on the mainframe computer system 230.

When the user (or application 216) wishes to define, name or rename a folder or add or remove an association of one or more files on the mainframe computer system 230 with the folder, the user signals operating system 212. Operating system 212 signals client directory services provider 226. The user may use client directory services provider 226 via operating system 212 to navigate through the hierarchy of folders the user or applications may define as described in more detail below. Because operating system sends the requests from the user to client directory services provider 226, the user interface used to perform the navigation matches or is similar to the navigation of the file structure of local disk drives that is provided by operating system 212.

If the user selects the "new folder" command or clicks again on a selected folder in order to rename it, or right clicks the properties of the folder, or if an application such as application 216 attempts to perform these functions, client directory services provider 226 receives from operating system 212 one or more requests identifying the desired function and signals registry interface 214.

Registry interface 214 receives folder names for new folders and inserts in client registry 224 a folder object with the name of the folder at the location in the hierarchy indicated in the request. If the request is generated by WINDOWS EXPLORER, the location indicated in the request is the folder corresponding to the window with the focus at the time the user selects the new folder command. When client directory services provider 226 signals registry interface 214, it provides to registry interface 214 an identifier of the parent folder of the new folder. Registry interface 214 inserts the new folder into the folder data structure in client registry 224 as a child of the indicated folder.

If operating system provides a request indicating that a folder name may be changed, client directory services provider 226 signals registry interface with an identifier of the folder, such as its former name, an indication that the folder name is to be changed and the new name. Registry interface 214 receives any new folder name and stores it in client registry 224 in place of the existing folder name for that folder.

In one embodiment, each folder object has a set of properties that includes a files property. If operating system 212 indicates that the properties of a folder are to be displayed, for example because a user right clicked a selected folder and moved down to the last entry, "properties," client directory services provider 226 signals registry interface 214 with an identifier of the selected folder and an indication that the files property is to be provided. Registry interface 214 retrieves from client registry 214 the current files property of the folder indicated in the request. If operating system 212 provides a new set of properties and an indication they should be stored, registry interface 214 stores in client registry 224 any changes to the files properties for the folder in the folder object corresponding to the folder.

The files property of a folder contains a list of filenames and or templates, which can correspond to multiple filenames, for the files that are to be associated with the folder. In one embodiment, the templates or filenames can be marked as inclusive or exclusive. An inclusive file name is a file name that is included in the list of one or more files to be associated with the folder. An exclusive file name overrides an inclusive filename. A user can thus use two templates to include files beginning with "th5" but exclude files starting with "th5N".

If operating system provides a request to open a folder and display the subfolders of the folder, client directory services provider 226 retrieves from client registry 224 all of the child folders of the selected folder on the mainframe computer system 230.

If operating system 212 provides a request for names of files associated with a folder, the filenames may be obtained from the mainframe in any of several ways, each of which use a common foundation, which will now be described.

Personal computer communications interface 222 is a communications process and a communication interface card such as a conventional token ring LAN card or other conventional local area network interface or other conventional communications interface such as a conventional modem. PC communications interface 222 communicates with mainframe communications interface 232 which is a communications process that runs as a started task on the mainframe computer system 230 under operating system 236, such as MVS. If necessary, PC communications interface logs the user into the operating system 230 on mainframe computer system 230 as described in copending application 09/441,765.

Mainframe directory services provider 226 is part of a started task that is capable of retrieving from operating system 236 the name of files stored in mainframe file storage 238 to which the user has access as allowed by the security system such as RACF as described in more detail in copending application Ser. No. 09/441,765. Operating system 236 may be the conventional MVS operating system and mainframe file storage 238 can be any conventional file storage such as DASD or tape storage. In one embodiment, mainframe directory services provider 226 retrieves the names of all files stored on mainframe file storage 238 to which the user has access and in another embodiment, mainframe directory services provider retrieves names corresponding to a particular set of filenames and templates.

In one embodiment, when client directory services provider 226 receives from operating system 212 via UNC provider mapper 220 a request for the filenames contained in a folder, client directory services provider 226 provides the names of all the files on the mainframe computer system 230 corresponding to the files property of the selected folder. To make this display, client directory services provider 226 retrieves from client registry 224 the files property of the folder as described above. Client directory services provider 226 provides the names and other characteristics such as data and size, representing files on the mainframe having names corresponding to the files property of the selected folder.

To obtain the names of the files on the mainframe computer system 230, client directory services provider 226 retrieves, from client registry 224 and sends to mainframe directory services provider 226 via PC communications interface 222 and mainframe communications interface 232 the files property of the selected folder. Mainframe directory services provider 226 requests from operating system 236 the names of the files that it has permission to view on mainframe computer system 230 matching the files property it receives using one or more conventional SVC 26 mainframe instructions, and returns to client directory services provider 226 the names and other characteristics of the files it receives. Because. the SVC 26 instruction only matches to a prefix, if the files property match is other than a strict prefix (e.g. TRE*G*), mainframe directory services provider 226 requests from operating system 236 the names of the prefix character up to the first wildcard character, and then performs its own filtering of the filenames returned by operating system 236 to correspond to the particular files property it is attempting to match. In another embodiment, mainframe directory services provider 226 requests from operating system 236 the names of all of the files that it has permission to view on mainframe computer system 230 and filters according to the files property.

Mainframe directory services provider 226 builds a list of the names of the files according to the files property it receives and returns the list it builds to client directory services provider 226 via operating system 236, mainframe communications interface 232 and PC communications interface 222. In the embodiment in which mainframe directory services provider 226 receives all of the filenames it has permission to view, mainframe directory services provider builds the list of filenames by adding to the list filenames received from operating system 236 that match the "include" templates in the files property, removing from the list those in any "exclude" templates in the files property, and then adding to the list filenames received from operating system 236 matching filenames in the files property. When client directory services provider 226 receives the list, it provides it, for example by displaying the filenames to the user via operating system 212.

If a file is to be opened, operating system 212 signals UNC provider/mapper 220 as described above. UNC provider/mapper 220 signals client file retriever/provider 228 to retrieve a portion, which can include some or all, of the file indicated. Client file retriever/provider 228 passes the name of the file to mainframe file retriever/provider 234, which retrieves the portion of the file in mainframe file storage 238 using operating system 236.

Mainframe file retriever/provider 234 returns the portion of the file, via the reverse path used to send the request, to client file retriever/provider 228. The portion of the file may be less than all of the file, and the file may be converted, as described in copending application Ser. No. 09/442,018. Client file retriever/provider 228 provides the portion of the file or a handle to the portion of the file stored in memory or disk to UNC provider/mapper 220. UNC provider/mapper 220 provides the portion of the file or handle it receives to operating system 212.

In one embodiment, operating system 212 will indicate to UNC provider/mapper 220 whether the file is being opened for writing. If so, UNC provider/mapper 220 signals client file retriever/provider 234, which signals mainframe file retriever/provider 234. Mainframe file retriever/provider 234 signals operating system 236 to lock the file before it retrieves the portion of the file as described in copending application Ser. No. 09/441,764. When the requester closes the file by sending a command to operating system 212, the same path is used to inform mainframe file retriever/provider 234 that the file is to be closed. Mainframe file retriever/provider 234 signals operating system 236 to close the file and release the lock.

If operating system 212 receives a. command to save a portion of a file onto the network device representing the mainframe computer system 230, it signals UNC provider/mapper 220 as described above and includes a handle to the portion of the file. UNC provider/mapper 220 signals client file retriever/provider 228 and includes the handle. Client file retriever/provider 228 sends (via operating system 212, PC communications interface 222, mainframe communications interface 232 and operating system 236) the portion of the file to mainframe file retriever/provider 234, which stores the file into mainframe file storage 238 via operating system 236.

Although there is only one client computer system 210 and one mainframe computer system 230 shown in FIG. 2, there may be multiple client computer systems coupled to the mainframe computer system, and one or more client computer systems may be coupled to more than one mainframe computer system. Each of these systems is similar or identical to the client computer system 210 and mainframe computer system 230 shown in the Figure.

In one embodiment, UNC provider/mapper 220 can handle communications with multiple mainframe computer systems 230 by registering a different network drive or UNC identifier for each mainframe computer system. In such embodiment, the identifier of the mainframe computer system is passed to client directory services provider 226 or client file retriever/provider 228 along with the request. Client directory services provider 226 or client file retriever/provider 228 then communicate with the appropriate communications channel on personal computer communications interface depending on the identifier of the mainframe computer system.

The client registry 224 is shown contained in the client computer system 210 that it serves. This allows each client computer system 210 to define its own folders and populate them with files as described above. However, it may be desirable to enforce a requirement that two or more client computer systems 210 have some or all of their folders that are uniform. This allows a department or workgroup to have a commonly defined set of folders and files in the folders. In such embodiment, a shared client registry (not shown) is used either in place of, or in addition to the client registry 224. The shared client registry may be located on one of the client computer systems 210 or one of the mainframe computer systems 230. In one embodiment, client file retriever/provider 228 and client directory services provider 226 use the shared client registry in place of or in addition to the client registry 224 when performing the functions described above. In another embodiment, some or all of the apparatii 212–214 and 220–228 are duplicated on each client computer system 210. One of the sets of apparatii uses a client registry 224 on the client computer system as shown. The other set uses a shared client registry shared across several client computer systems and represented by a different UNC identifier or network drive letter. The central client registry is defined using a registry interface similar to registry interface 214 as described above.

Figure 3:
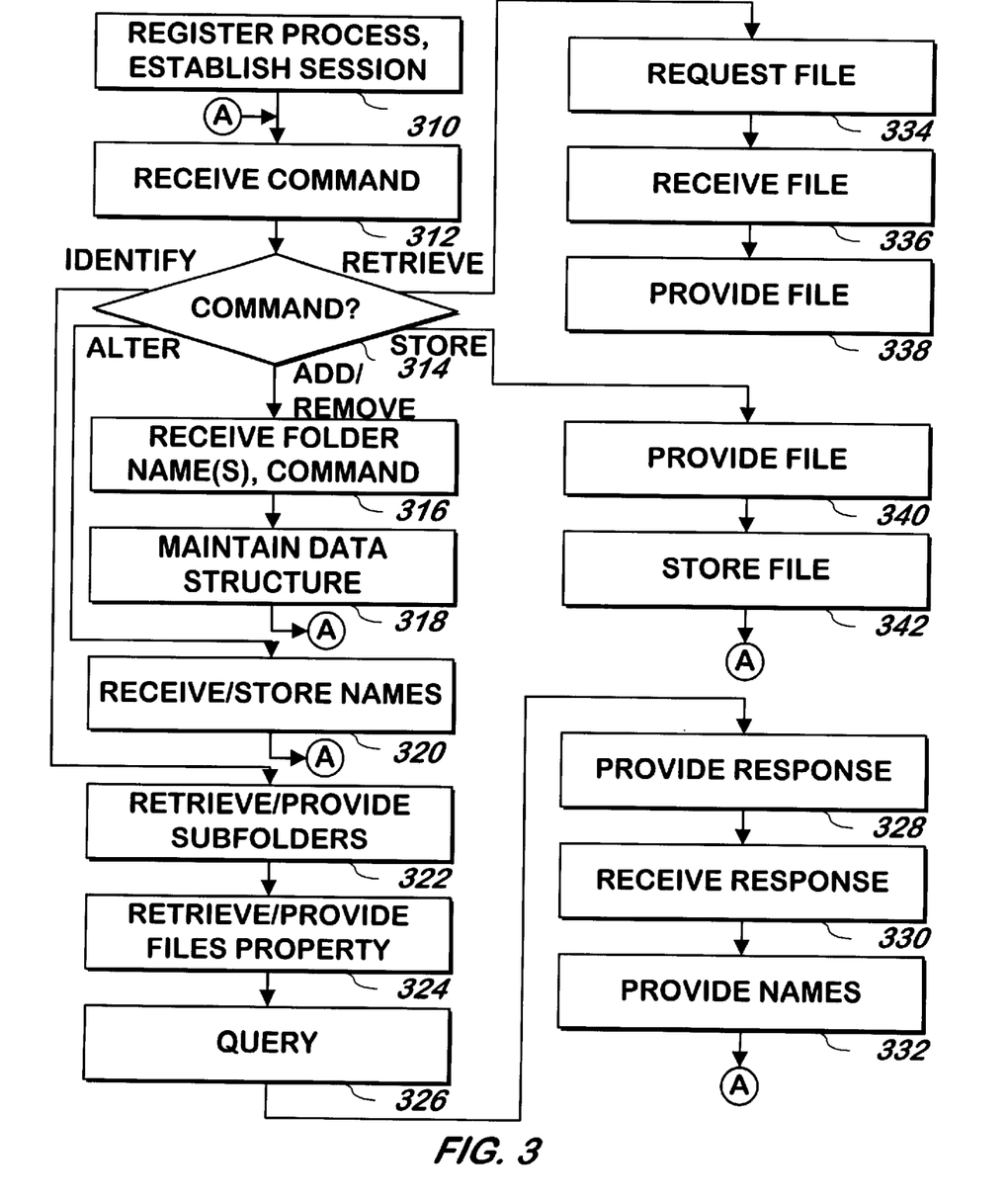
FIG. 3 is a flowchart illustrating a method of accessing and manipulating files on a mainframe computer system from a client computer system according to one embodiment of the present invention.

Referring now to FIG. 3, a method of accessing and manipulating files on a mainframe computer system from a client computer system is shown according to one embodiment of the present invention. A process in communication with the mainframe is registered 310 to the operating system of the personal computer as described above. As part of step 310, a session with the mainframe is established, for example by logging into the mainframe as described above and in copending application Ser. No. 09/441,765. A command is received 312 from the operating system. If the command is a command to add or remove a folder 314, one or more names or other identifiers of one or more folders on the personal computer are received 316 as described above, along with a command to add or delete the folder. A data structure representing the folders is maintained 318 in response to the name or names received in step 316 and the command received in step 312. The method continues at step 312.

If the command is a command to alter the files property of a selected folder (or to alter the name of the selected folder) 314, the names or other identifiers of mainframe files are (or the new name of the folder is) received and stored 320 associated with the folder as described above. The method continues at step 312.

If the command is a command to identify the contents of a selected folder 314, any subfolders of the selected folder are retrieved and provided 322, for example to a display or application, as described above. The files property is retrieved and provided 324 to the mainframe as described above. The mainframe operating system is queried for matches with the files property or queried for all filenames available to the client computer as described above and the result is matched to the files property 326 and the list of files resulting from step 326 is returned to 328, and received 330 by the personal computer where it is provided 332, for example to a display or application. The method continues at step 312.

If the command is a command to retrieve a portion of a file 314, some or all of the file having the specified name is requested 334 and received 336. The portion of the file is provided 338 to the requester. The method continues at step 312.

If the command is a command to store a portion of the file, the file is provided 340 to the mainframe where it is stored 342. The method continues at step 312.

What is claimed is:

1. A method of associating at least one file on a mainframe computer system to a plurality of folders on a client computer system, the method comprising:

for each of the plurality of folders, receiving an identifier of the folder;

associating the identifiers of the folders received with an identifier representing the mainframe on the client computer system;

for each of the plurality of folders, receiving at least one selected from at least one identifier of a file on the mainframe computer system and at least one template capable of specifying an identifier of each of a plurality of files on the mainframe computer system; and storing the at least one identifier of a file on the mainframe computer system and at least one template capable of specifying an identifier of each of a plurality of files on the mainframe received associated with said folder for which it was received.

2. The method of claim 1 wherein the storing step is performed on the client computer system.

3. The method of claim 1 wherein the storing step is performed on the mainframe computer system.

4. A computer program product comprising a computer useable medium having computer readable program code embodied therein for associating at least one file on a mainframe computer system to a plurality of folders on a client computer system, the computer program product comprising:

computer readable program code devices configured to cause a computer to, for each of the plurality of folders, receive an identifier of the folder;

computer readable program code devices configured to cause a computer to associate the identifiers of the folders received with an identifier representing the mainframe on the client computer system;

computer readable program code devices configured to cause a computer to, for each of the plurality of folders, receive at least one selected from at least one identifier of a file on the mainframe computer system and at least one template capable of specifying an identifier of each of a plurality of files on the mainframe computer system; and computer readable program code devices configured to cause a computer to store the at least one identifier of a file on the mainframe computer system and at least one template capable of specifying an identifier of each of a plurality of files on the mainframe received associated with said folder for which it was received.

5. The computer program product of claim 4 wherein the computer readable program code devices configured to cause a computer to store cause the storage to be performed on the client computer system.

6. The computer program product of claim 4 wherein the computer readable program code devices configured to cause a computer to store cause the storing to be performed on the mainframe computer system.

7. An apparatus for associating at least one file on a mainframe computer system with at least one folder defined for at least one client computer system, the apparatus comprising:

a registry interface having a first input/output operatively coupled for receiving a plurality of folder identifiers, and for at least one of the folder identifiers, the first input/output also for receiving at least one file descriptor corresponding to a name of at least one file on the mainframe computer system, and having a second input/output for providing the plurality of folder identifiers and the at least one file descriptor; and a client registry having an input/output coupled to the registry interface for storing the plurality of folder identifiers and for storing the at least one file descriptors associated with at least one of the at least one folder identifiers.

8. The apparatus of claim 7 wherein the client computer system comprises the client registry.

9. The apparatus of claim 7 wherein the mainframe computer system comprises the client registry.

10. A method of identifying a set of files stored on mainframe computer system contained in a folder of a client computer system, the method comprising:

retrieving at least one selected from at least one identifier of a file on the mainframe computer system associated with the folder and at least one template capable of specifying an identifier of each of a plurality of files on the mainframe computer system associated with the folder;

requesting from the mainframe computer system a set of identifiers of the files corresponding to the identifiers retrieved;

receiving the identifiers of the files; and providing at least one of the identifiers of the files received.

11. The method of claim 10 wherein the providing step comprises displaying the at least one of the identifiers of the files retrieved.

12. The method of claim 10 additionally comprising the steps of:

retrieving at least one identifier of a subfolder of the folder; and providing the identifier of the subfolder.

13. A computer program product comprising a computer useable medium having computer readable program code embodied therein for identifying a set of files stored on a mainframe computer system contained in a folder of a client computer system, the computer program product comprising:

computer readable program code devices configured to cause a computer to retrieve at least one selected from at least one identifier of a file on the mainframe computer system associated with the folder and at least one template capable of specify an identifier of each of a plurality of files on the mainframe computer system associated with the folder;

computer readable program code devices configured to cause a computer to request from the mainframe computer system a set of identifiers of the files corresponding to the identifiers retrieved;

computer readable program code devices configured to cause a computer to receive the identifiers of the files; and     computer readable program code devices configured to cause a computer to provide at least one of the identifiers of the files received.

14. The computer program product of claim 13 wherein the computer readable program code devices configured to cause a computer to provide comprise computer readable program code devices configured to cause a computer to display the at least one of the identifiers of the files retrieved.

15. The computer program product of claim 13 additionally comprising:

computer readable program code devices configured to cause a computer to retrieve at least one identifier of a subfolder of the folder; and     computer readable program code devices configured to cause a computer to provide the identifier of the subfolder.

16. An apparatus for identifying files associated with a selected folder having an identifier, the apparatus comprising:

a client registry having an input operatively coupled to receive a plurality of folder identifiers, an identifier of a position of each of the folder identifiers in a hierarchy and, for each of the plurality of folder identifiers, at least one file descriptor, cash file descriptor describing at least one name of a file on a mainframe computer system, the client registry for storing the plurality of folder identifiers, identifier of the position and, the at least one file descriptor associated with the respective folder and providing at an input/output the file descriptors associated with a folder responsive to a folder identifier received at the input/output;

a mainframe directory services provider having a first input output operatively coupled to receive at least one file identifier, the mainframe services provider for identifying and providing at the mainframe directory services provider first input/output a name of at least one mainframe computer file in a file storage coupled to a second input/output responsive to the at least one file identifier received at the mainframe directory services provider first input/output;

a client directory services provider having a first input/output coupled to receive the identifier of the selected folder, a second input/output coupled to the client registry and a third input/output coupled to the mainframe services provider first input/output, the client directory services provider for providing at the client directory services provider second input/output the identifier of the selected folder received at the client directory services provider first input/output, receiving at the client directory services provider second input/output at least one file descriptor associated with the selected folder, providing at the client directory services provider third input/output said at least one file descriptor, receiving at the client directory services provider third input output and providing at the client directory services provider first input/output the name of the at least one file of the mainframe computer system.

17. The apparatus of claim 16 wherein the client directory services provider third input is coupled to the mainframe directory services provider first input/output by a client computer-to mainframe computer communications line.

18. The apparatus of claim 16 wherein the client directory services provider is additionally for retrieving via the client directory services provider second input/output and providing via the client directory services provider first input/output an identifier of at least one folder descendant from the selected folder.

19. A method of retrieving a file from a mainframe computer system to a client computer system, the method comprising;

registering to an operating system on the client computer system in order to be assigned a drive identifier by the operating system;

receiving a request for the file stored on the mainframe computer system from the client computer operating system;

transmitting a request for the file to the mainframe computer system;

receiving the file from the mainframe computer system; and     providing to the operating system one selected from the file and a location of the file.

20. The method of claim 19 wherein the request for a file comprises an identifier of a folder associated with a plurality of less than all of the files on the mainframe computer system.

21. The method of claim 20 wherein:

the request is intended to be processed by a mainframe operating system; and     the registering step comprises registering to a windows-based operating system.

22. A computer program product comprising a computer useable medium having computer readable program code embodied therein for retrieving a file from a mainframe computer system to a client computer system, the computer program product comprising:

computer readable program code devices configured to cause a computer to register to an operating system on the client computer system in order to be assigned a drive identifier by the operating system;

computer readable program code devices configured to cause a computer to receive a request for the file stored on the mainframe computer system from the client computer operating system;

computer readable program code devices configured to cause a computer to transmit a request for the file to the mainframe computer system;

computer readable program code devices configured to cause a computer to receive the file from the mainframe computer system, and     computer readable program code devices configured to cause a computer to provide to the operating system one selected from the file and a location of the file.

23. The computer program product of claim 22 wherein the request for a file comprises an identifier of a folder associated with a plurality of less than all of the files on the mainframe computer system.

24. The computer program product of claim 23 wherein;
the request is intended to be processed by a mainframe operating system; and
the computer readable program code devices configured to cause a computer to register comprises computer readable program code devices configured to cause a computer to register to a windows-based operating system.

* * * * *

UNITED STATES PATENT AND TRADEMARK OFFICE
CERTIFICATE OF CORRECTION

PATENT NO. : 6,513,048 B1
DATED : January 28, 2003
INVENTOR(S) : Bruce Engle and Kevin Parker It is certified that error appears in the above-identified patent and that said Letters Patent is hereby corrected as shown below:

Column 1,
Line 49, insert -- other --, between "or" and "folders".

Column 3,
Line 43, "PENTIUM III-compatable" should read -- PENTIUM III-compatible --.

Column 10,
Line 41, insert -- a -- between "on" and "mainframe" in line 2.

Column 11,
Line 51, insert -- / -- (slash) between "input" and "output".

Signed and Sealed this

Twenty-eighth Day of October, 2003

JAMES E. ROGAN
*Director of the United States Patent and Trademark Office*